C. W. Case,
Gage Lathe.
Nº 5,481.            Patented Mar. 21, 1848.
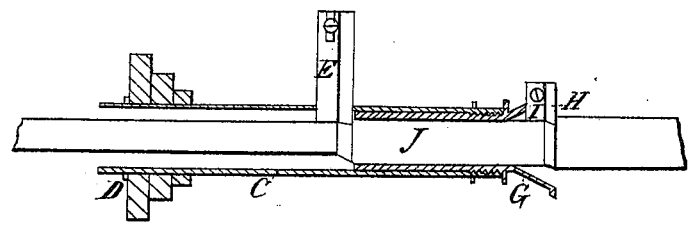
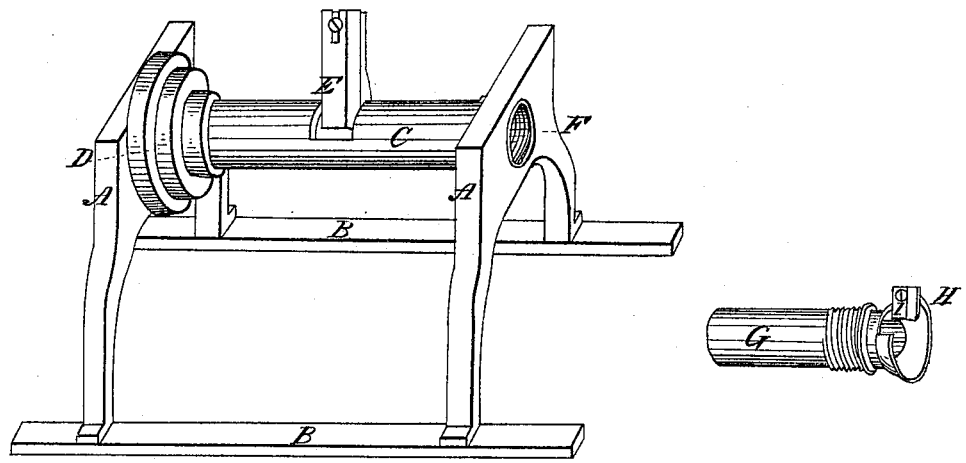

UNITED STATES PATENT OFFICE.

CHAUNCEY W. CASE, OF SYRACUSE, NEW YORK.

APPARATUS FOR TURNING.

Specification of Letters Patent No. 5,481, dated March 21, 1848.

*To all whom it may concern:*

Be it known that I, CHAUNCEY W. CASE, of Syracuse, in the county of Onondaga and State of New York, have invented a new and useful Improvement in Turning-Lathes; and I do hereby declare the following to be a full, clear, and exact description of the construction and operation of the same, reference being had to the annexed drawings, making part of this specification.

Make a lathe in any of the known or convenient forms, having head blocks (A, A,) supported or raised upon a frame work (B). Make a hollow mandrel, (C) having its hollow lengthwise through its center, and supported by the two head blocks (A, A,). Upon this mandrel place several pulleys (D), around which a band may be passed for the purpose of driving the mandrel. Make an opening in the mandrel between the pulleys and head block, and attach thereto a finishing cutter (E) which will revolve with the mandrel. In the end of the mandrel at (F) I cut a screw for the attachment of mouthpieces of various sizes. Make mouthpieces (G) of such dimensions as to fit the opening in the mandrel, and furnished with a screw by which they may be attached to the mandrel at (F). Make the mouthpieces to extend within the hollow mandrel to the finishing cutter (E), and having an opening through its center lengthwise for the passage of the stick that is being turned. In the end of the mouthpieces at (H) place a cutter (I) which shall reduce the stick to the same diameter as that of the opening through the mouthpiece. On the outside of the mouthpieces cut a screw to fit the screw in the mandrel.

(J), the stick to be turned, may be held from revolving, and be passed through the hollow mandrel by any of the devices known for that purpose, and in common use.

By the extension of the mouthpieces within the hollow mandrel a substantial support is formed for the stick while it is being turned by the cutters (E and I). Sticks of various sizes may be turned by changing mouthpieces.

What I claim as my invention and desire to secure by Letters Patent, is—

1. The manner herein described of adapting lathes to turning sticks or pieces of wood of various sizes, viz., by means of the attachment of mouthpieces as described, to the revolving hollow mandrel (by the aid of the screw joint) arranged and operating as set forth, thereby dispensing with the necessity of changing mandrels for the same purpose.

2. I also claim the manner above described of holding the stick within the hollow mandrel, while it is being turned, viz., by means of the extension of the mouthpiece within the mandrel to the finishing cutter, and its opening made of the diameter mentioned.

CHAUNCEY W. CASE.

Witnesses:
R. F. STEVENS,
D. E. TRUE.